United States Patent
Tuma

(10) Patent No.: US 6,627,133 B1
(45) Date of Patent: Sep. 30, 2003

(54) METHOD OF MANUFACTURING AN ADHESIVE FASTENER

(75) Inventor: Jan Tuma, Berlin (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 09/720,726

(22) PCT Filed: Jun. 1, 1999

(86) PCT No.: PCT/EP99/03787

§ 371 (c)(1),
(2), (4) Date: Feb. 21, 2001

(87) PCT Pub. No.: WO00/00053

PCT Pub. Date: Jan. 6, 2000

(30) Foreign Application Priority Data

Jun. 29, 1998 (DE) .......................... 198 28 856

(51) Int. Cl.[7] .............................................. B29C 47/08
(52) U.S. Cl. ........................................ 264/167; 264/214
(58) Field of Search ............................... 264/167, 210.2, 264/212, 214; 24/452; 428/100

(56) References Cited

U.S. PATENT DOCUMENTS

| 3,312,583 | A | * | 4/1967 | Rochlis | 15/187 |
|---|---|---|---|---|---|
| 5,057,259 | A | * | 10/1991 | Parmelee | 264/166 |
| 5,554,333 | A | * | 9/1996 | Fujiki | 264/173.1 |
| 5,781,969 | A | * | 7/1998 | Akeno et al. | 24/442 |
| 5,879,604 | A | * | 3/1999 | Melbye et al. | 264/167 |
| 5,951,931 | A | * | 9/1999 | Murasaki et al. | 24/452 |
| 6,162,040 | A | * | 12/2000 | Clune | 264/167 |
| 6,287,665 | B1 | * | 9/2001 | Hammer | 24/452 |

FOREIGN PATENT DOCUMENTS

| DE | 197 30 217 | 3/1998 |
|---|---|---|
| DE | 196 46 318 | 5/1998 |

* cited by examiner

*Primary Examiner*—Mark Eashoo
(74) *Attorney, Agent, or Firm*—Smith, Gambrell & Russell, LLP

(57) ABSTRACT

The invention relates to a method for producing a fixing closure element comprising a plurality of interlocking means which are configured with a support (17) as one piece. According to the inventive method, a thermoplastic material is fed to the slit between a pressure tool (3) and a shaping tool (5). A sieve (11) comprising continuous cavities is used as a shaping element on the shaping tool (5). The interlocking means are formed such that the thermoplastic material is at least partially hardened in the cavities of the sieve (11). A shaping tool which comprises a second shaping element (11), said element interacting with the cavities of the sieve, is used on the side of the sieve (13) facing away from the pressure tool (3). The thermoplastic material is shaped using said second shaping element.

11 Claims, 11 Drawing Sheets

METHOD OF MANUFACTURING AN ADHESIVE FASTENER

Figure 1:
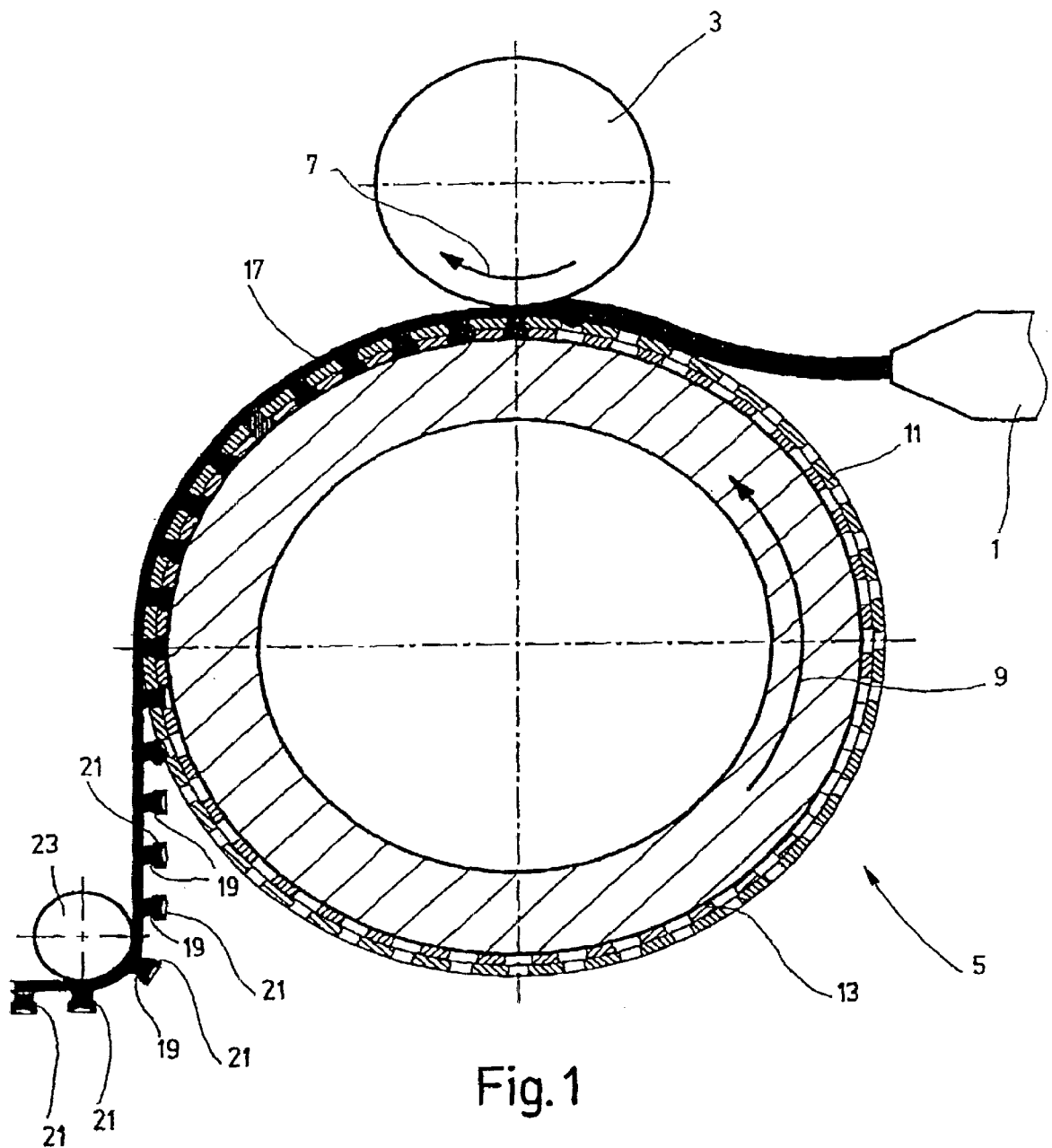

The invention pertains to a method of manufacturing an adhesive fastener with a plurality of interlocking means in the form of stems having thickened parts at their terminal end and formed in one piece with a substrate, in which process a shapeable material in a plastic or liquid state is fed to the nip between a pressing tool and a shaping tool and these are driven such that the substrate is formed in the nip and conveyed in a transport direction, in which a screen having throughgoing cavities is used as the shaping element on the shaping tool, and in which the interlocking means are formed in that the shapeable material hardens at least partially in the cavities of the screen.

A method of this type has already been indicated as known in DE 196 46 318 A1. Disclosed as a possible application of an adhesive fastener produced in this manner is, in particular, the formation of an adhesive fastener for infant diapers or for hospital garments. For use in such articles of clothing a relatively large number of interlocking means per $cm^2$ are required. In the known methods this leads to very high manufacturing costs for the shaping tool which, corresponding to the large number of interlocking means, requires a shaping tool with a correspondingly large number of cavities per $cm^2$. In order to guarantee that terminal thickened parts can be formed at the outer end of the stems formed by the impressed plastic, it is, moreover, necessary in the known processes for the screen cavities to have radii running inwards at their edges, at least on the side turned away from the pressing tool. By virtue of these radii, terminal thickened parts are formed on the stems, at least in rough form, already upon being filled with plastic.

The shaping of the very large number of cavities in the screen which are necessary for this, which can be accomplished by etching, galvanizing or by means of laser machining, leads to high manufacturing costs. The invention is therefore based on the problem of creating a method of this type that can be carried out with process equipment that is simpler and cheaper to produce and can therefore be carried out more efficiently.

In a method of the type mentioned initially, this problem is solved according to the invention in that a shaping tool is used such that it has a second shaping element interacting with its cavities on the side of the screen facing away from the pressing tool, by virtue of which element the shapeable material is formed in the area of the outer ends of the stems.

By the use of a second shaping element for structuring the terminal end of the stems, no particular demands are made on the geometry of the openings of the screen. In particular, the form and nature of the terminal areas of the stems formed by the filled-in material does not depend on the edge radii of the screen openings. This yields the advantage of a simpler and cheaper manufacturing of the screen.

Pressing tool and shaping tool can, as in the aforementioned known method, be provided as a pressing cylinder and a shaping cylinder, which are appropriately driven such that between them a conveyance gap is formed, through which the substrate is moved in the conveyance direction, where the shaping cylinder has the screen serving as the first shaping element on its outer side and the second shaping element is arranged in the inside on the cylinder body.

In a preferred embodiment, an internal second screen is used as the second shaping element arranged on the inside of the screen. If the cross-sectional size of the openings in the internal second screen are chosen to be somewhat larger than the cross-sectional size of the cavities of the first screen, then terminal thickened parts of the stems are formed upon filling in the plastic. The difference in cross section is chosen such that pulling out of the stems after setting or partial setting of the plastic can be done without difficulty. No elaborate machining to produce rounded corners is necessary for the cavities of the second screen either.

As the second shaping element arranged on the inside of the screen, a film provided with projections which extend into cavities of the screen is provided in a second embodiment, whereby depressions in the ends of the stems formed from plastic are generated during the filling of the thermoplastic material into the cavities. By virtue of the fact that the depressions in the formed stems are created in place of terminal thickened parts, there results the advantage of extremely simple extraction from the mold [cavities in the screen], without any particularly large extraction force having to be exerted.

Both in the example of forming terminal thickened parts and in the procedure of forming terminal depressions in the stems, mushroom shapes of the terminal thickened parts, advantageous for adhesive fasteners, can be achieved on the above-described stems by simple mechanical reshaping, by means of a heated or unheated calender, i.e., without a melting process having to occur.

By selecting the cross-sectional shapes of the cavities in the screen and/or the shape of the projections on the second shaping element, the terminal thickened parts of the stems can be formed, not only in the shape of mushroom tops that are flattened or have concave depressions, but also in polygonal or star shapes.

The object of the invention is also a sheet adhesive fastener which has the characteristics of claim 12.

Figure 2:
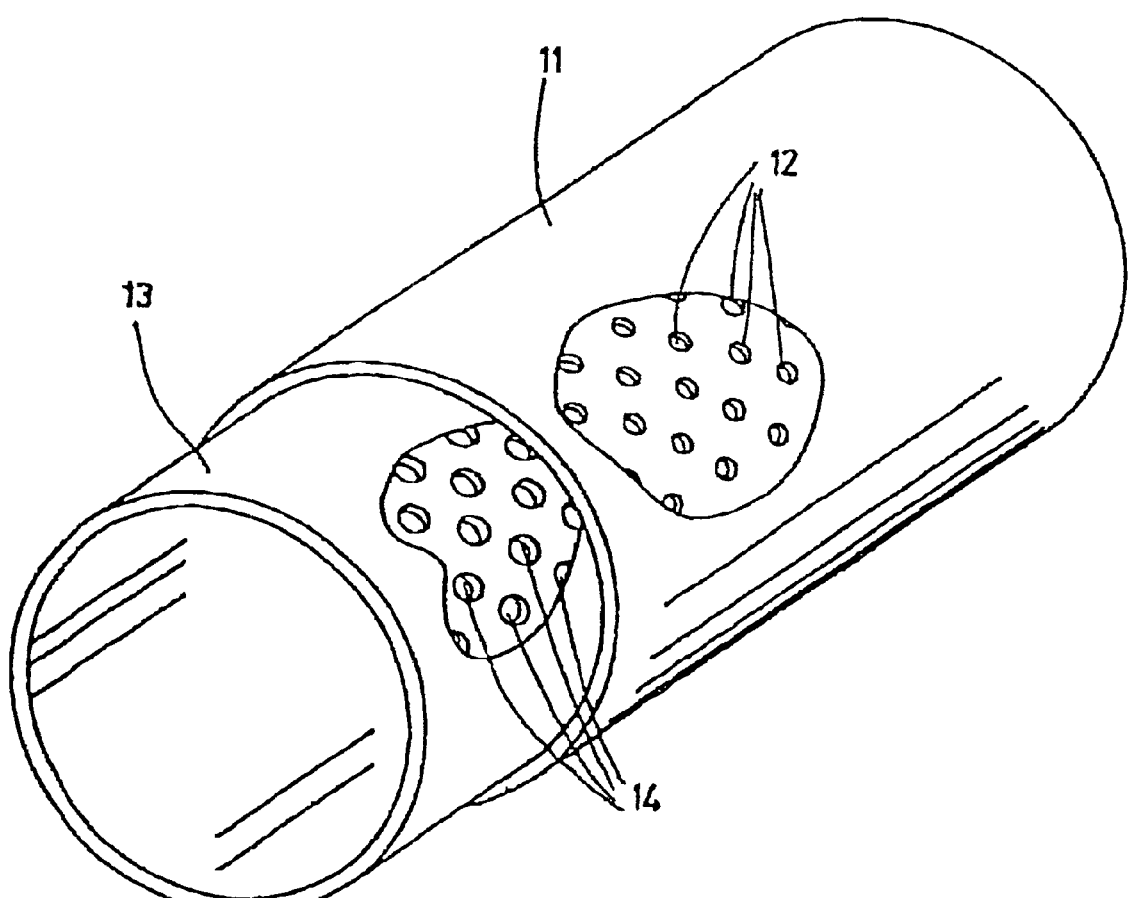
Figure 3A:
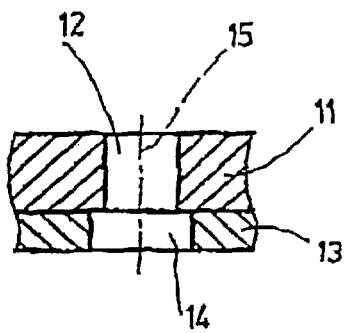
Figure 3B:
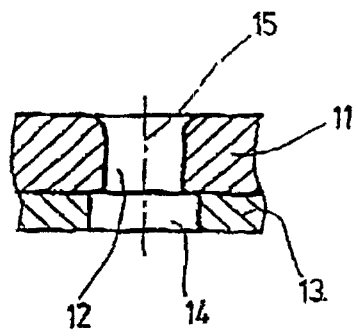
Figure 3C:
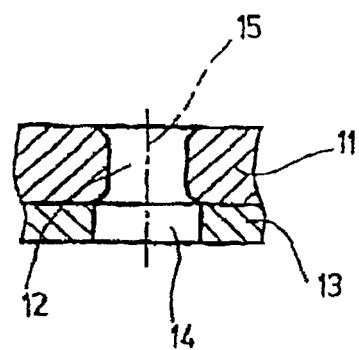
Figure 3:
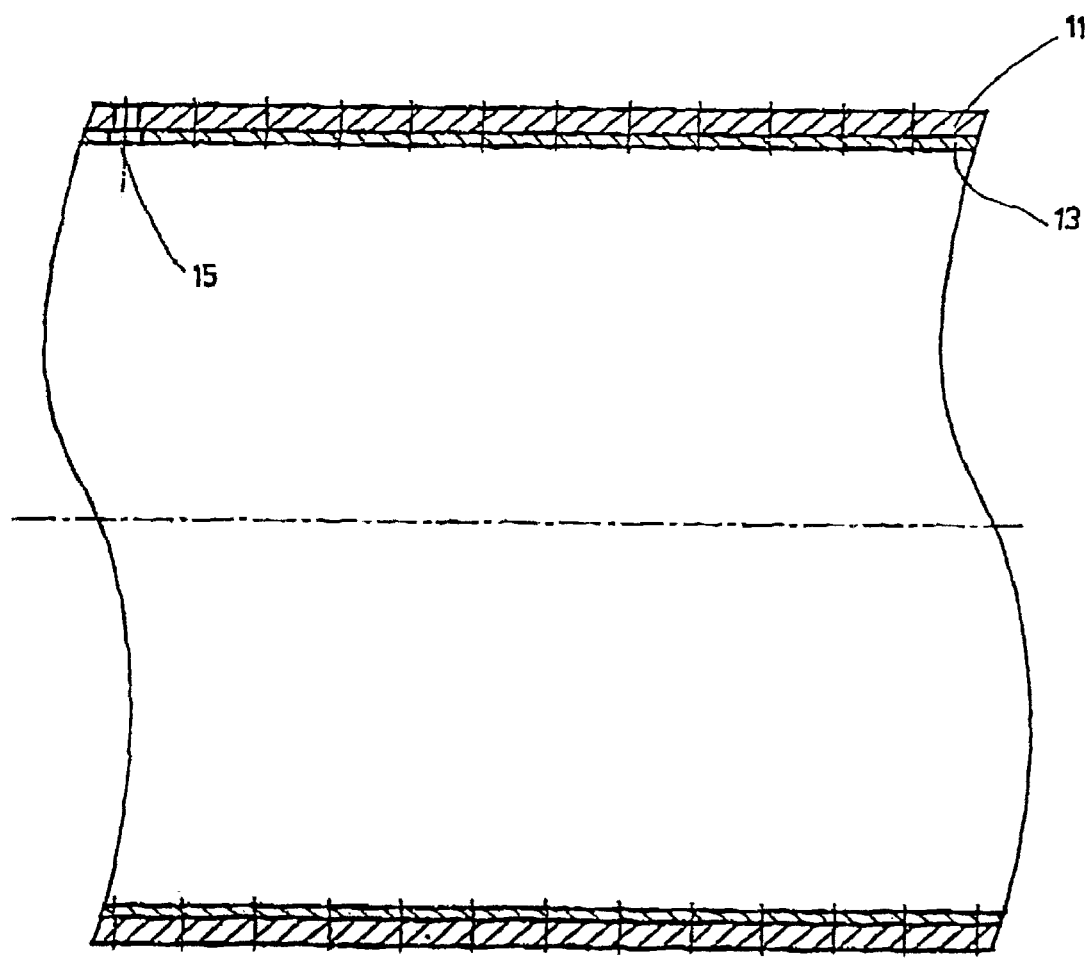
Figure 4:
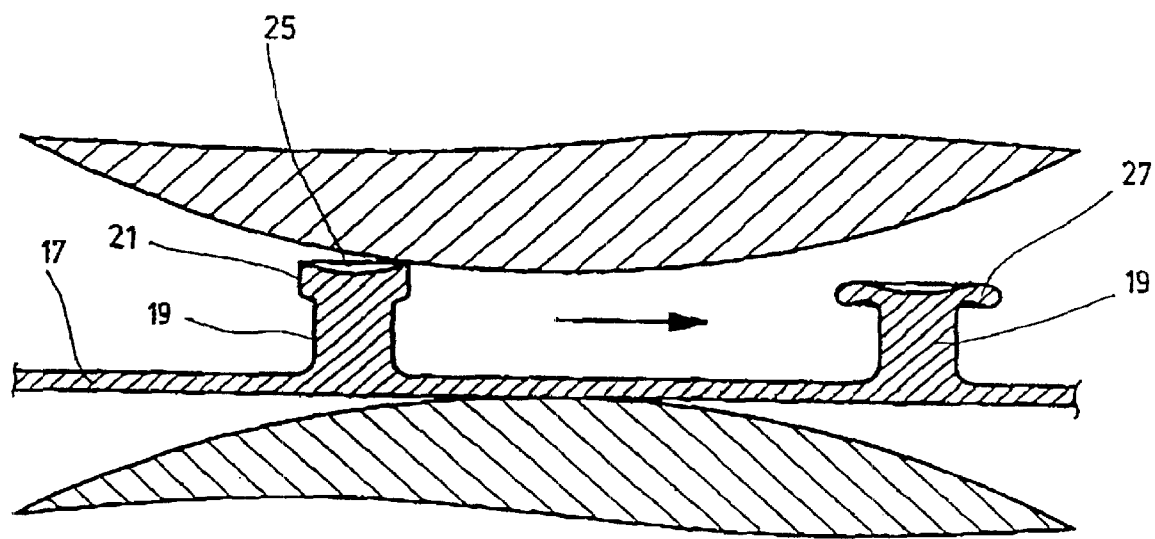
Figure 5A:
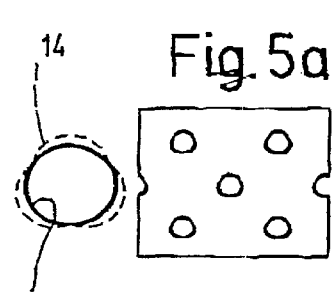
Figure 5B:
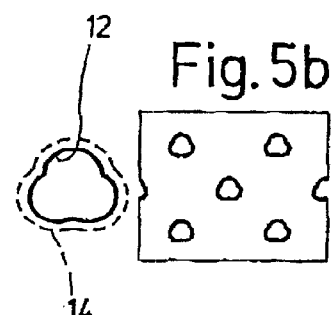
Figure 5C:
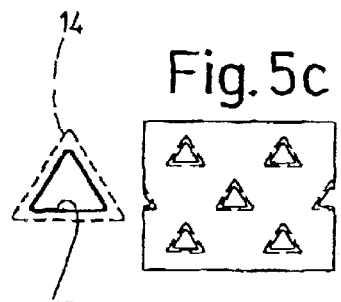
Figure 5D:
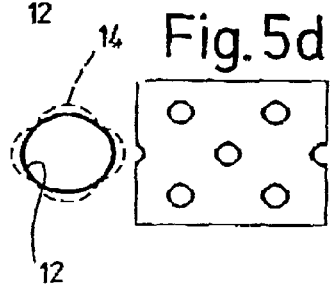
Figure 5E:
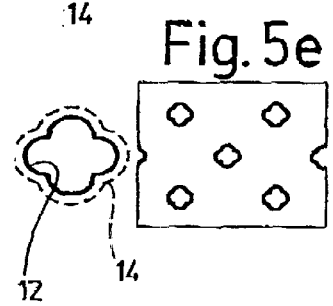
Figure 5F:
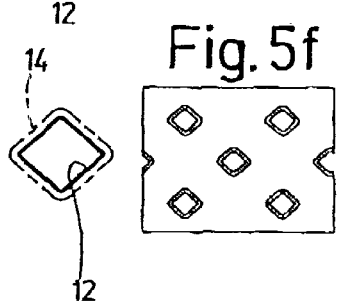
Figure 5G:
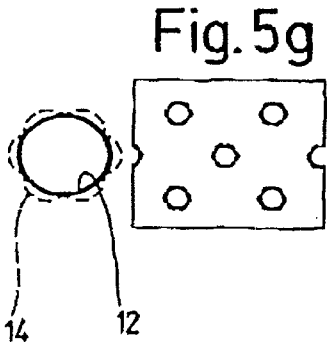
Figure 5H:
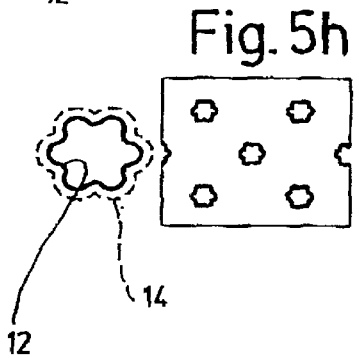
Figure 5I:
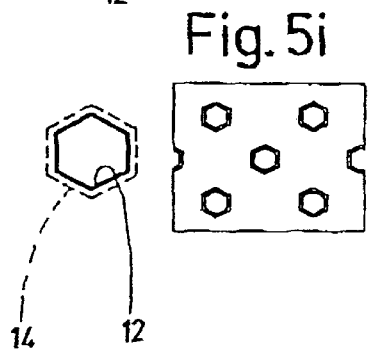
Figure 6:
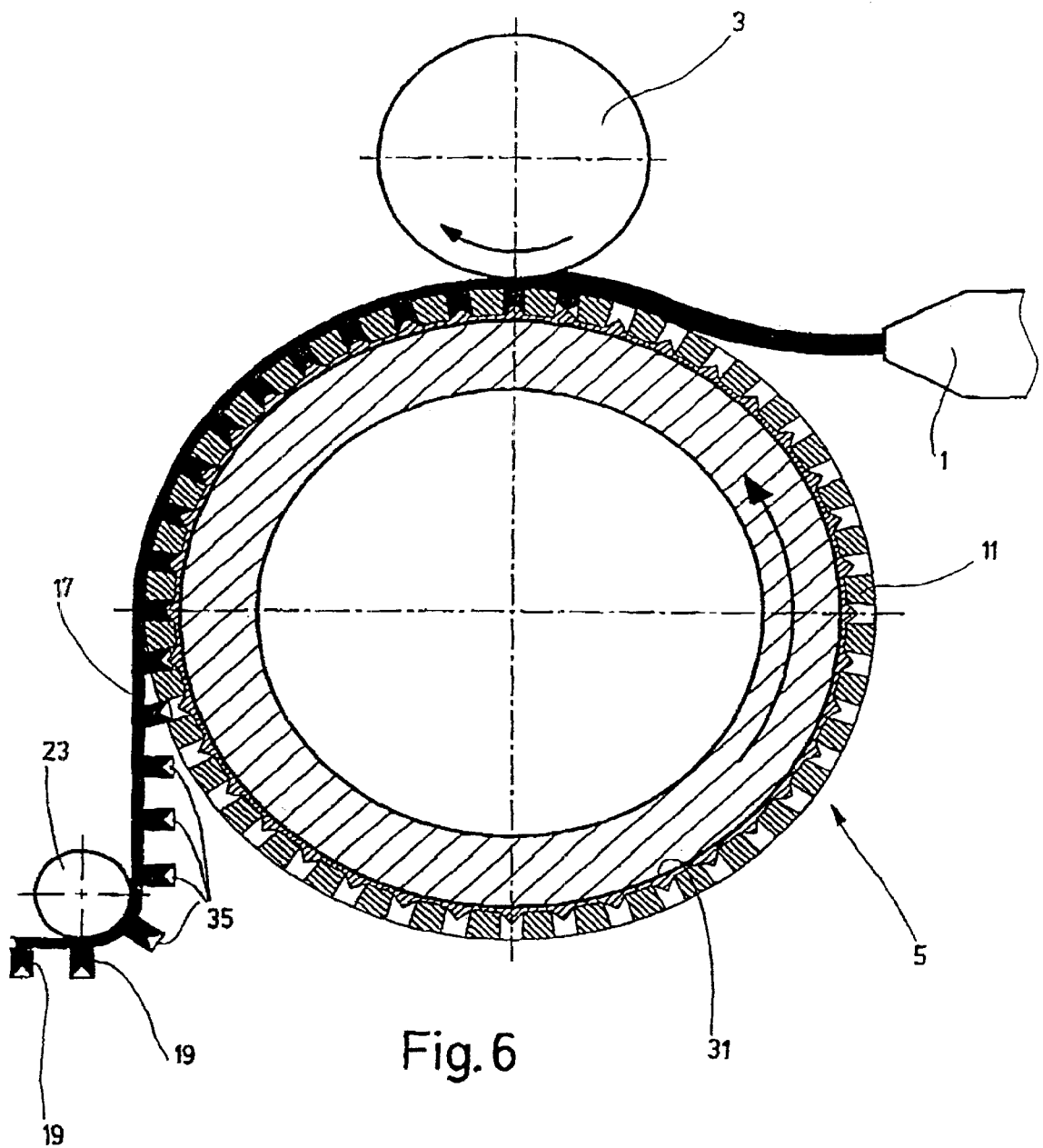
Figure 7:
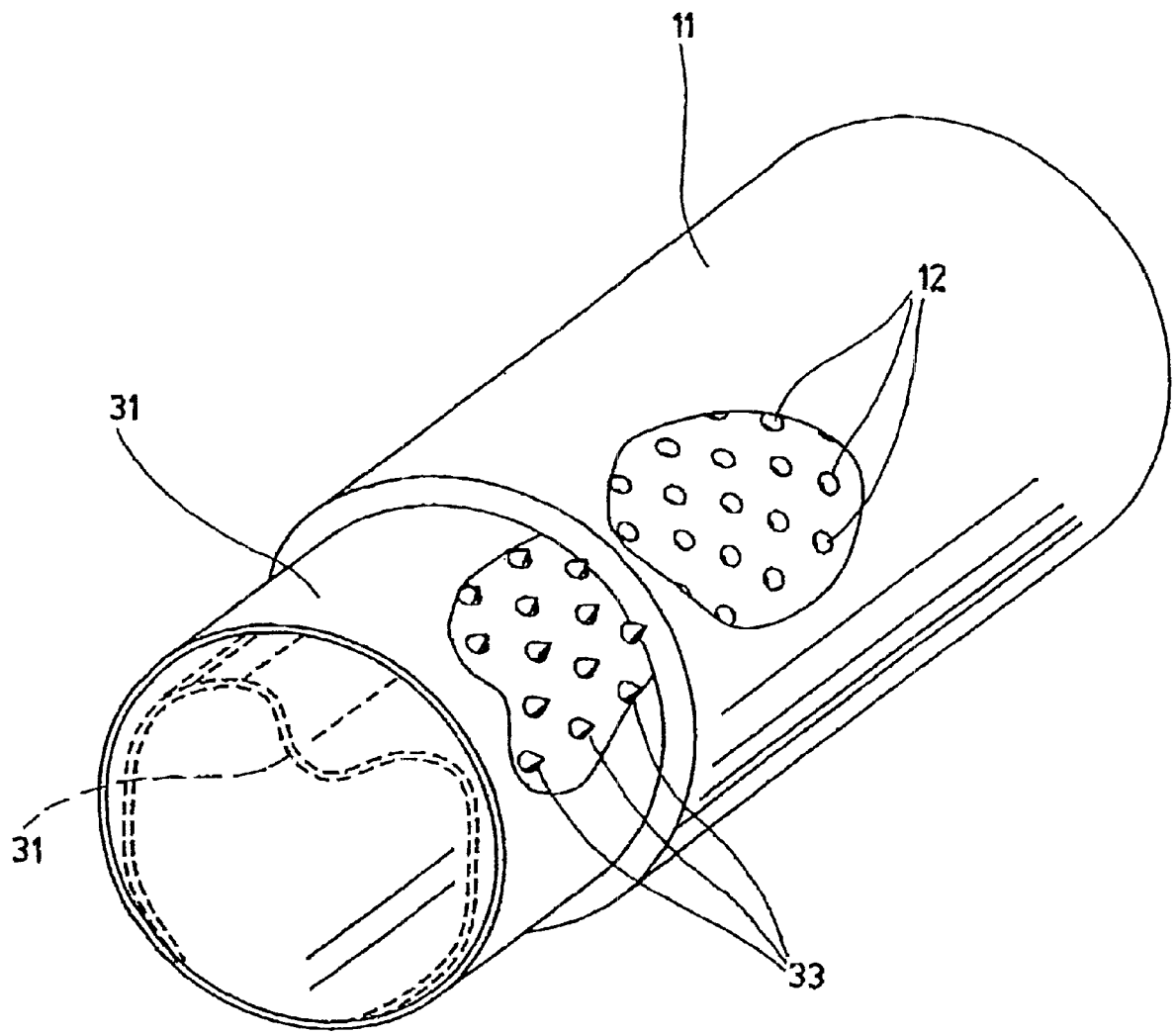
Figure 8:
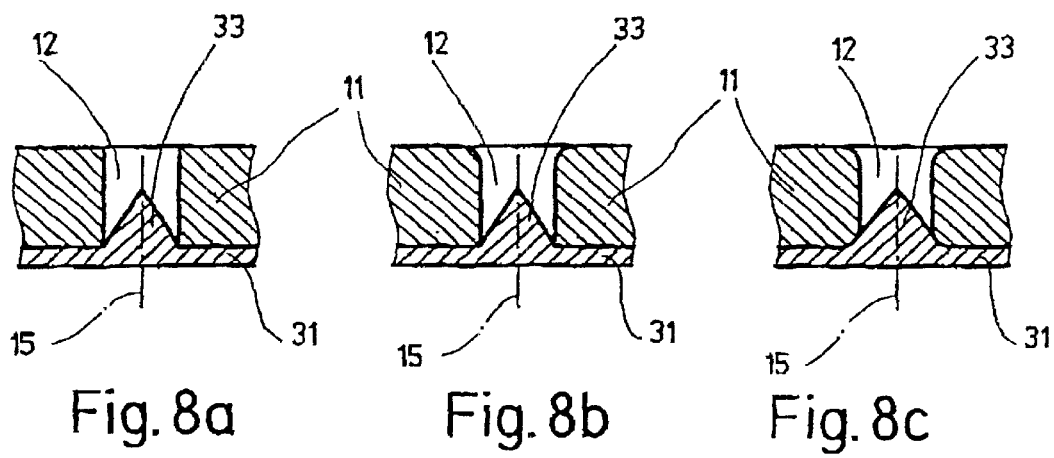
Figure 8:
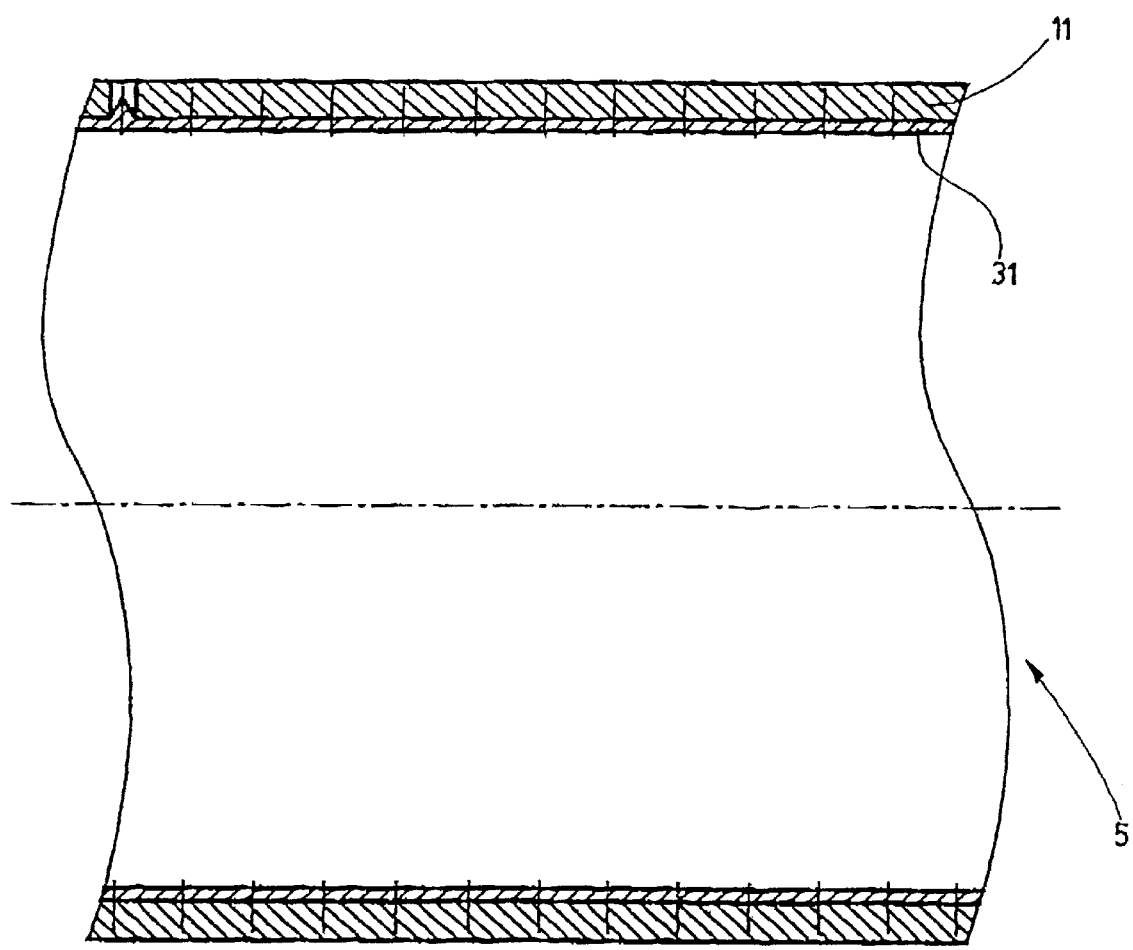
Figure 9:
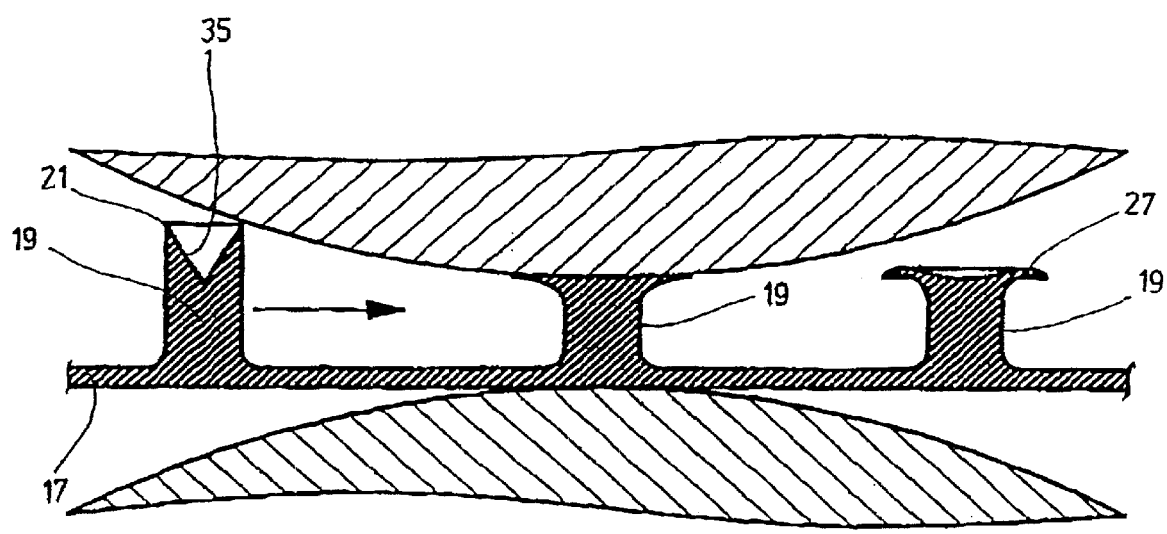
Figures 10, 11:
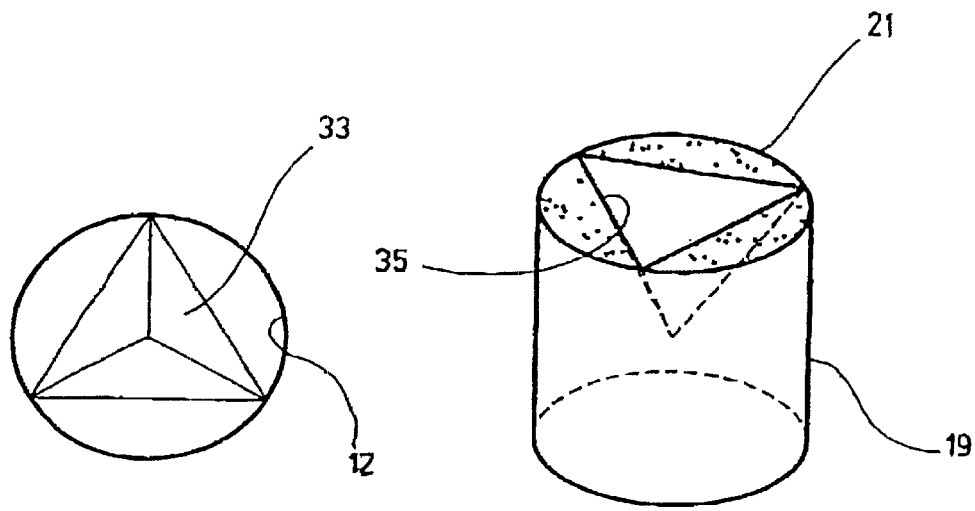
Figures 12A, 12B:
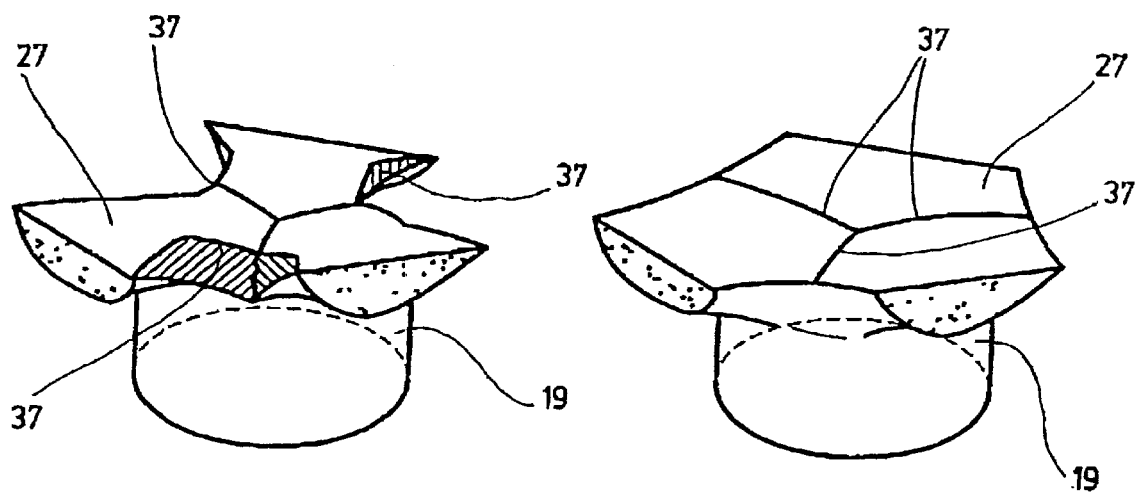
Figure 13A:
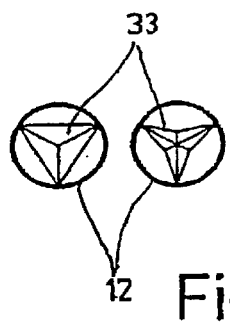
Figure 13B:
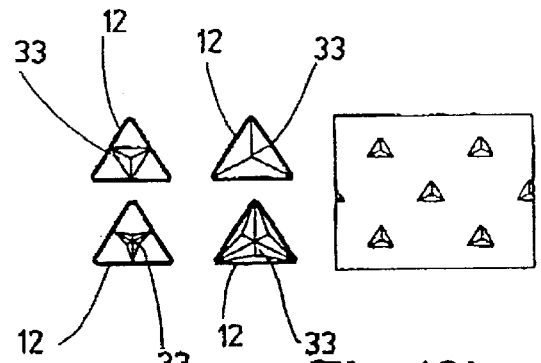
Figure 13C:
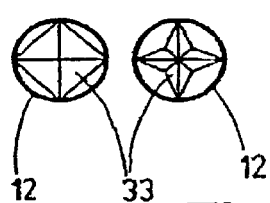
Figure 13D:
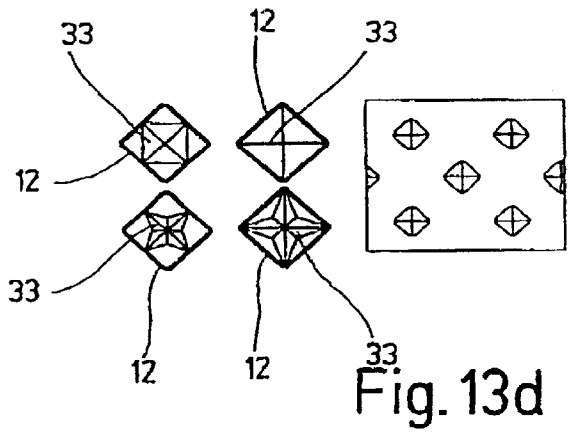
Figure 13E:
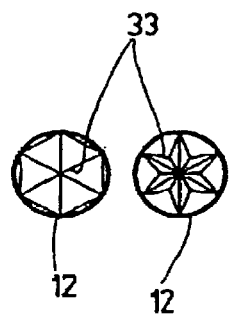
Figure 13F:
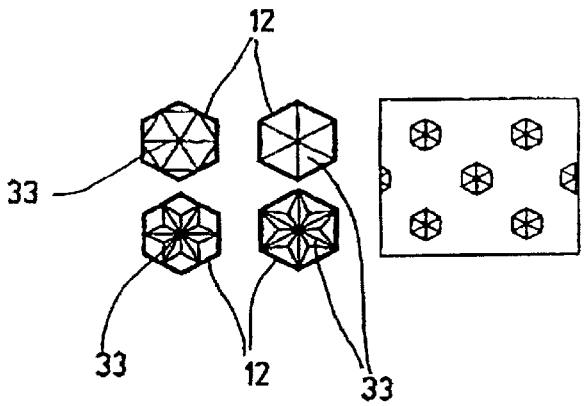

The invention is explained in detail below on the basis of embodiments illustrated in the drawings. Shown are:

FIG. 1, a side view, heavily schematized and partially cut away, of a device for carrying out the method according to the invention;

FIG. 2, a perspective view of two screens, one inserted into the other, with cavities formed by the screen openings shown in certain areas in exaggerated size for illustrative purposes;

FIG. 3, a schematized longitudinal section of part of a shaping cylinder with telescoped screens in keeping with FIG. 2;

FIGS. 3a–3c, cross sections drawn to enlarged scale of various cavities formed by the openings of the telescoped screens;

FIG. 4, a broken sectional view of a calender for mechanical reformation of the terminal ends of stems formed on a plastic substrate;

FIGS. 5a–5i, plan views, showing in exaggerated scale examples of cross-sectional shapes of screen cavities, the outlines of the openings in the inner screen being shown in dash lines;

FIG. 6, a view similar to FIG. 1 of another embodiment of a device for carrying out the method according to the invention;

FIG. 7, a representation similar to FIG. 2 showing a film with conical projections which is inserted into an outer screen, these [projections] as well as the corresponding openings of the screen being shown on an exaggeratedly large scale for illustrative purposes;

FIG. 8, a section similar to FIG. 3 of a part of a shaping cylinder with outer screen and inner film provided with projections;

FIGS. 8a–8c, sectional representations similar to FIGS. 3a–3c which show examples of possible designs of the cavities of the outer screen;

FIG. 9, a representation similar to FIG. 4 of a calender;

FIG. 10, a plan view, drawn to an exaggeratedly large scale, of an opening of the outer screen with projection of the inner film extending into it;

FIG. 11, a perspective view, drawn to an exaggeratedly large scale, of a stem formed of plastic with pyramid-shaped terminal depression;

FIGS. 12a & 12b, perspective views of shapes given to terminal thickened parts of the stem of FIG. 11 as produced by calendering;

FIGS. 13a–13f, plan views, drawn to an exaggeratedly large scale, of openings of the outer screen with projections of the inner film extending into them.

FIG. 1 shows in a schematic representation parts of a device for carrying out the method of the invention with an extruder head 1 as the supply device for thermoplastic material in a plastic or liquid state, which is fed as a strip, whose width corresponds to that of the adhesive fastener to be manufactured, to the nip between a pressing tool and a shaping tool. As the pressing tool, a pressing cylinder 3 is provided. The shaping tool is a shaping cylinder labeled 5 as a whole. Both cylinders are driven in the rotational directions indicated by arc-shaped arrows 7 and 9 in FIG. 1, so that a conveyance nip is formed between them, through which the plastic strip is conveyed in the transport direction, while simultaneously the plastic strip is shaped in the nip into the substrate 17 of the adhesive fastener and, on the side contacting the shaping cylinder 5, the substrate 17 receives the necessary shaping for the formation of interlocking means from the shaping elements of the shaping cylinder 5.

To this end, the shaping cylinder 5 has two shaping elements on its periphery, each in the form of a screen, namely an outer screen 11 and an inner screen 13, which are in contact with one another, see FIG. 2 as well. As can be seen particularly from FIGS. 1 and 3, the screens 11 and 13 are telescoped such that the cavities 12 and 14 formed respectively by the openings of the outer screen 11 and the inner screen 13 are aligned with a joint axis 15, see particularly FIG. 3a.

As the latter figure shows particularly clearly, the thickness of the outer screen 11 is greater than that of the inner screen 13, whose cavities 14 are in turn larger than the cavities 12 of the outer screen 11. Because of this configuration, the plastic pressed into the cavities 12 and 14 in the nip between pressing cylinder 3 and shaping cylinder 5 is formed such that projecting stems 19 with thickened ends 21 are formed on the substrate 17. The difference in cross-sectional sizes of the cavities 12 and 14 is selected such that the widening at the ends 21 is just large enough that, after partial or complete hardening of plastic, the extraction of the stems 19 from the cavities 12,14 can be done safely when the substrate 17 is led off the shaping cylinder 5 via an extraction cylinder 23.

As is evident, in particular, from FIG. 4 on the example of the stem 19 drawn in at the left, the free end of the stem 19 removed from the screens 11, 13 has at its free end 21 not only a thickened part, but also a small depression 25 that originates from the air included in the screens. By being guided through the calender, only hinted at in part in FIG. 4, which may be heated or unheated, the thus formed ends 21 of the stem 19 can be deformed into the interlocking means with mushroom cap shaped terminal thickened parts 27, as shown at the right.

In the selection of the geometry of the stems 19, it should be borne in mind that the thickness of the stems 19 be chosen large enough in relation to their length that only the ends 21 are flattened during calendering, but the entire stem 19 is not bent to the side.

FIGS. 3a–3c show that the shape of the screen openings forming the cavities 12 and 14 can be chosen in various types. In particular, as FIG. 3a shows, rounded-off edges are not necessary. They can be provided, however, as FIGS. 3b and 3c show, on the outside edge of the outer screen 11 or on both sides. The inner screen 13 could also have corresponding rounded corners. Deviating from the representations in FIGS. 1–3, it is also possible for the thicknesses of screens 11 and 13 to be equal. An exact positioning of the screens 11 and 13 relative to one another can be accomplished by gluing with, for instance, a two-component adhesive, before pulling them onto the shaping cylinder 5.

FIGS. 5a–5i show a number of possible examples of cross-sectional shapes of the screen openings, where the outline of the openings of the inner screen 13 that define the cavities 14 are indicated in dash lines and the corresponding outline of the cavities 12 of the outer screen 11 are drawn in solid lines. Upon impression of the plastic into the cavities, wherein all extrudable plastics that can be pressed into hollow molds may be utilized, differently shaped ends 21 on the stems 19 result, which lead to interlocking means in the form of thickened parts 27 of various shapes after calendering.

FIG. 6 shows an additional example of a device for carrying out the method with a shaping cylinder 5 modified in comparison to the previously described example. In place of an inner screen as its second shaping element, this one has, in contact with the inside of the outer screen 11, a film 31 with external elevations in the form of projections 33. Like the cavities 14 of the inner screen 13 in the first embodiment, the projections 33 in the example being currently described are oriented towards the cavities 12 of the outer screen 11 in alignment with the axis 15 (FIGS. 8a–8c). As FIGS. 7 and 8 show, the outer screen 11 is of thicker material, having a thickness of, for instance, several tenths of a millimeter, while the inner film 31 can be considerably thinner, for instance, only 0.1 mm thick. The projections 33, which may conical, pyramidal or star-shaped, can be produced by, for instance, etching, as is also done for cutting films for rotary punching devices. Figures are formed in this case with edge angles of ca. 60°. Spiked cylinders with a fabric-reinforced rubber backing 3–8 mm thick can also be used. Because of the elevations, the inner film 31 cannot be directly slid into the outer screen 11, but can be folded as shown in FIG. 7 by dash lines, such that it can be inserted. When the film 31 then bends back into its round shape, the projections 33 center outer screen 11 and inner film 31 with respect to one another in that the projections 33 move into the cavities 12 of the screen 11. Gluing together is therefore not absolutely necessary.

As FIGS. 8a–8c show, the edges of the cavities 12 of the outer screen 11 can be straight or rounded off. Due to the action of the projections 33, pronounced depressions are formed at the ends 21 of the stems 19, see left side of FIG. 9 or FIG. 11. Since the ends 21 do not experience any widening during the shaping process of the stems 19, the substrate 17 with the stems 19 can be very easily removed from the shaping cylinder 5. In calendering, which is conducted as previously described with reference to FIG. 4, the terminal depressions 35 result in terminal thickened parts 27 as interlocking parts that may resemble a mushroom cap, a star or the like in shape, independently of the shaping given to the cross section of the cavities 12 of the screen 11 and the shape of the projections 33.

FIGS. 10 and 11 illustrate the formation of a pyramidal depression 35 by a pyramidally shaped projection 33. Depending on the type of plastic material used, this pyramidal shape of the depression 35 brings about a shape of the terminal thickened part 27 as shown in FIG. 12*a* or the shape of terminal thickened part 27 shown in FIG. 12*b*. If a plastic is involved which tears at the pyramid edges 37 during calendering, the head shape shown in FIG. 12*a* comes about; otherwise the shape shown in FIG. 12*b* results.

FIGS. 13*a*–13*f* show some examples of possible shapes of the cavities 12 of the outer screen 11 and projections 33 extending into the cavities. It is understood that other geometrical shapes can also be selected. Biodegradable materials (BAW) can also be considered for use as the shapeable materials for conducting the method according to the invention. BAW may be produced from renewable or petrochemical materials or from combinations of the two.

What is claimed is:

1. Method of manufacturing an adhesive fastener with a plurality of interlocking means in the form of stems having thickened parts at their terminal end and formed in one piece with a substrate, in which process a shapeable material in a plastic or liquid state is fed to the nip between a pressing tool and a shaping tool and these are driven such that the substrate is formed in the nip and conveyed in a transport direction, in which a screen having throughgoing cavities is used as the shaping element on the shaping tool, and in which the interlocking means are formed in that the shapeable material hardens at least partially in the cavities of the screen, characterized in that the side of the screen facing away from the pressing tool has a second shaping element interacting with its cavities, by which the shapeable material is shaped in the area of the outer ends of the stems characterized in that a film with projections which extend into the cavities of the screen is used as the second shaping element arranged on the inside of the screen and in that depressions in the ends of the stems formed from the plastic are created by these projections.

2. Method according to claim 1, characterized in that, by appropriate shaping of the projections of the film, depressions of a conical, pyramidal or star shape are created in the ends of the stems.

3. Method for producing an adhesive fastener having a substrate and projecting stems having ends as interlocking means, in which method a mouldable material is conveyed in the plastic or liquid state to a nip between a pressing cylinder and a shaping cylinder which are driven so the substrate is formed in the nip and is conveyed in a transport direction, in which method an outer screen having a first set of cavities for shaping the stems of the interlocking means as a result of at least partial hardening of the mouldable material in the first set of cavities of the outer screen, and in which method an inner screen having a second set of cavities cooperates with the first set of cavities of the outer screen and by which the mouldable material is moulded in the region of the ends of the projecting stems on the inner side of the outer screen remote from the pressing cylinder, characterized in that an inner second screen or a film provided with projections which extend into the first set of cavities of the outer screen and which produce depressions in the ends of the projecting stems moulded from plastic material is used as the second shaping element arranged on the inner side of the outer screen.

4. Method according to claim 3, characterized in that a thermoplastic material is used as the mouldable material.

5. Method according to claim 4, characterized in that polyolefins or blends of polyamides are used as the thermoplastic material.

6. Method according to claim 3, characterized in that the shaping cylinder is moderated in temperature.

7. Method according to claim 3, characterized in that the second set of cavities are enlarged compared to the first set of cavities.

8. Method according to claim 3, characterized in that the first set of cavities and the second set of cavities have different cross-sectional shape and/or have a cross-sectional shape other than a circular shape.

9. Method according to claim 3, characterized in that the inner screen and the outer screen have a different thickness.

10. Method according to claim 3, characterized in that a conical shape, a pyramid shape or a star shape are formed in the ends of the stems.

11. Method according to claim 3, wherein the ends are deformed by calendaring in order to form shaped terminal thickened parts.

\* \* \* \* \*